(12) United States Patent
Sokabe et al.

(10) Patent No.: US 8,886,774 B2
(45) Date of Patent: Nov. 11, 2014

(54) REMOTE CONTROL DEVICE, REMOTE CONTROL SETTING METHOD, AND PROGRAM

(75) Inventors: Ryo Sokabe, Saitama (JP); Hiroki Inamitsu, Tokyo (JP); Takahiro Ushioda, Tokyo (JP); Naoki Yuasa, Chiba (JP)

(73) Assignee: Sony Corporation (JP)

(*) Notice: Subject to any disclaimer, the term of this patent is extended or adjusted under 35 U.S.C. 154(b) by 261 days.

(21) Appl. No.: 13/165,861

(22) Filed: Jun. 22, 2011

(65) Prior Publication Data

US 2012/0005337 A1 Jan. 5, 2012

(30) Foreign Application Priority Data

Jun. 30, 2010 (JP) ................ P2010-149368

(51) Int. Cl.
| | |
|---|---|
| *G06F 15/177* | (2006.01) |
| *G08C 17/00* | (2006.01) |
| *H04N 5/455* | (2006.01) |
| *H04L 12/24* | (2006.01) |
| *H04L 29/08* | (2006.01) |
| *H04M 11/00* | (2006.01) |
| *H04L 12/58* | (2006.01) |

(52) U.S. Cl.
CPC ............ *G08C 17/00* (2013.01); *H04L 67/025* (2013.01); *H04M 11/00* (2013.01); *H04L 67/125* (2013.01); *H04L 29/08099* (2013.01); *H04L 51/18* (2013.01); *H04N 5/455* (2013.01); *H04L 41/08* (2013.01); *G08C 2201/20* (2013.01)
USPC ........... 709/220; 709/202; 709/217; 709/227; 709/248; 340/12.22; 341/176; 348/14.05; 348/114; 348/734; 455/3.03; 455/92; 455/151.1; 455/352; 455/353; 455/419

(58) Field of Classification Search
USPC ............ 348/114, 211.99, 734; 709/217, 220; 455/418
See application file for complete search history.

(56) References Cited

U.S. PATENT DOCUMENTS

| | | | |
|---|---|---|---|
| 6,912,429 B1 * | 6/2005 | Bilger | 700/19 |
| 7,921,194 B2 * | 4/2011 | Song et al. | 709/223 |

(Continued)

FOREIGN PATENT DOCUMENTS

| | | |
|---|---|---|
| JP | 10-290487 A | 10/1998 |
| JP | 11275667 | 10/1999 |

(Continued)

OTHER PUBLICATIONS

Office Action from Japanese Application No. 2010-149368, dated Dec. 10, 2013.

*Primary Examiner* — Michael Y Won
(74) *Attorney, Agent, or Firm* — Lerner, David, Littenberg, Krumholz & Mentlik, LLP

(57) ABSTRACT

There is provided a remote control device including: a communication unit that can perform communication through a network; a remote control unit that can transmit one or more control commands to a controlled device in response to an operation by a user; a storage unit that stores control command information specifying the one or more control commands to be transmitted from the remote control unit; and a setting unit that sets the control command information to the storage unit based on a result of communication by the communication unit with a controlled device through the network, wherein the setting unit detects a controlled device connected to the network by transmitting a device search signal from the communication unit, acquires device information of the detected controlled device from the controlled device, and decides the control command information to be set to the storage unit based on the acquired device information.

9 Claims, 10 Drawing Sheets

(56) References Cited

U.S. PATENT DOCUMENTS

| | | | |
|---|---|---|---|
| 2003/0121673 A1* | 7/2003 | Kacyra et al. | 172/1 |
| 2004/0090464 A1* | 5/2004 | Shake et al. | 345/773 |
| 2008/0109093 A1* | 5/2008 | Maeda et al. | 700/90 |
| 2010/0137945 A1* | 6/2010 | Gadagkar et al. | 607/60 |
| 2011/0287757 A1* | 11/2011 | Nykoluk et al. | 455/419 |
| 2013/0086245 A1* | 4/2013 | Lu et al. | 709/223 |
| 2014/0115025 A1* | 4/2014 | Taoka et al. | 709/201 |

FOREIGN PATENT DOCUMENTS

| | | |
|---|---|---|
| JP | 2003087275 A | 3/2003 |
| JP | 2003102073 A | 4/2003 |
| JP | 2004015787 A | 1/2004 |
| JP | 2004235960 A | 8/2004 |
| JP | 2004304356 A | 10/2004 |
| JP | 2006246021 A | 9/2006 |
| JP | 2007174166 A | 7/2007 |

* cited by examiner

| MANUFACTURER | MODEL | CONTROL TYPE |
|---|---|---|
| ABC | TV01 | T1 |
| ABC | TV02 | T1 |
| ABC | DVD1 | T2 |
| DEF | TV12 | T3 |
| : | : | : |

CONTROL TYPE TABLE

| CONTROL TYPE | KEY | INFRARED FORMAT | CUSTOM CODE | DATA CODE |
|---|---|---|---|---|
| T1 | Power | A | 101 | 1 |
| T1 | Volume- | A | 101 | 2 |
| T1 | Volume+ | A | 101 | 3 |
| : | : | : | : | : |
| T2 | Power | B | 201 | 1 |
| T2 | Play | B | 201 | 4 |
| : | : | : | : | : |
| T3 | Power | B | 1001 | 1 |
| T3 | Volume+ | B | 1001 | 2 |
| : | : | : | : | : |

COMMAND SYSTEM TABLE

| REGISTERED NAME | KEY | INFRARED FORMAT | CUSTOM CODE | DATA CODE |
|---|---|---|---|---|
| ABC:TV01 | Power | A | 101 | 1 |
| | Volume- | A | 101 | 2 |
| | Volume+ | A | 101 | 3 |
| | : | : | : | : |

CONTROL COMMAND INFORMATION TABLE

| REGISTERED NAME | KEY | INFRARED FORMAT | CUSTOM CODE | DATA CODE |
|---|---|---|---|---|
| ABC:TV01 | Power | A | 101 | 1 |
| | Volume- | A | 101 | 2 |
| | Volume+ | A | 101 | 3 |
| | : | : | : | : |
| DEF:TV12 | Power | B | 1001 | 1 |
| | : | : | : | : |
| JKL:AUD1 | Power | D | 110 | 1 |
| | : | : | : | : |

CONTROL COMMAND CANDIDATE TABLE

FIG.7

```
                                              ~162
M-SEARCH * HTTP/1.1
HOST: XXX.XXX.XXX.XXX:NNNN
MAN: "ssdp:discover"
MX: 3
ST: ssdp:all
    :
```

FIG.8

```
                                              ~164
HTTP/1.1 200 OK
CACHE-CONTROL: max-age =NNNN
DATE: YYYYMMDDhhmmss
EXT:
LOCATION: <URL for Device Description>
    :
```

FIG.9

```
<?xml version="1.0"?>
<root xmlns="urn:schemas-upnp-org:device-1-0">
    :
  <device>
    <deviceType>urn:schemas-upnp-org:device.X</deviceType>
    <manufacturer>ABC</manufacturer>
    <modelName>TV01</modelName>
    <modelNumber>M1</modelNumber>
    <modelURL>http://---.ABC.com/</modelURL>
    <serialNumber>0000001</serialNumber>
    :
  </device>
</root>
```

FIG.12

```
<?xml version="1.0"?>
<root xmlns="urn:schemas-upnp-org:device-1-0">
    :
  <device>
    <deviceType>urn:schemas-upnp-org:device.X</deviceType>
    <manufacturer>ABC</manufacturer>           ~168
    <modelName>TV01</modelName>
    <modelNumber>M1</modelNumber>
    <modelURL>http://---.ABC.com/</modelURL>
    <serialNumber>0000001</serialNumber>
    :
    <controlCommandInfo>                       ~244
    <format>A</format>
    <power>
       <customCode>101</customCode>
       <dataCode>1</dataCode>
    </power>
    <volumeUp>
       :
    </controlCommandInfo>
  </device>
</root>
```

~266

REMOTE CONTROL DEVICE, REMOTE CONTROL SETTING METHOD, AND PROGRAM

CROSS-REFERENCE TO RELATED APPLICATION

The present application claims priority from Japanese Patent Application No. JP 2010-149368 filed in the Japanese Patent Office on Jun. 30, 2010, the entire content of which is incorporated herein by reference.

BACKGROUND

The present disclosure relates to a remote control device, a remote control setting method, and a program.

Remote controllers (remote control devices) for controlling electronic equipment at a distance have been widely used. Remote controllers include a dedicated type that can be used for one or several types of models of a single manufacturer and a common type that can be used for various types of models of a plurality of manufacturers. Among them, since many different varieties of electronic equipment are used at home and office today, common type remote controllers, which are also called universal remote controllers, are receiving attention for their convenience. The common type remote controllers are broadly classified into a preset type that prestores a plurality of control command systems in an internal memory and a learning type that learns and stores a control system in an ex post manner.

One of advantages of the preset remote controller is that it is not necessary to newly register a control command system to the remote controller. Even if a controlled device does not support a learning function, the preset type remote controller can remotely control the controlled device as long as it stores a control command system for the controlled device. On the other hand, one of advantages of the learning remote controller is that an unknown controlled device can become a target of remote control afterwards. In order to reduce the burden of a user at the time of newly setting a control command system to the learning remote controller, a technique that registers information related to a control command system easily (without relying on manual labor) by use of an additional means such as an IC card prepared for each controlled device is known (cf. e.g. Japanese Unexamined Patent Publication No. 10-290487).

SUMMARY

However, in the technique disclosed in Japanese Unexamined Patent Publication No. 10-290487 described above, a user needs to connect a special IC card to the remote controller at the time of learning a control command system. Further, providing an additional means such as an IC card for each device is not preferable for manufacturers of controlled devices in terms of cost. Furthermore, when using the preset remote controller, a user needs to appropriately select a control command system corresponding to the user's own controlled device such as a household electrical appliance from a plurality of prestored control command systems. However, considering that numerous control command systems can be prestored in the preset remote controller under circumstances where an enormous number of models of controlled devices are placed on the market by many different manufacturers, it is not easy for a user to appropriately select a control command system among them.

In light of the foregoing, it is desirable to provide novel and improved remote control device, remote control setting method, and program that can reduce the burden of a user at the time of setting a control command system for a new controlled device.

According to an embodiment of the present disclosure, there is provided a remote control device including: a communication unit that can perform communication through a network; a remote control unit that can transmit one or more control commands to a controlled device in response to an operation by a user; a storage unit that stores control command information specifying the one or more control commands to be transmitted from the remote control unit; and a setting unit that sets the control command information to the storage unit based on a result of communication by the communication unit with a controlled device through the network, wherein the setting unit detects a controlled device connected to the network by transmitting a device search signal from the communication unit to the network, acquires device information of the detected controlled device from the controlled device, and decides the control command information to be set to the storage unit based on the acquired device information.

The device information may contain a device class for identifying a type of the detected controlled device, the remote control device may be accessible to an internal or external database that stores one or more known device classes and associated control command information for a controlled device belonging to each device class, and the setting unit may set the control command information associated with the device class contained in the acquired device information in the database to the storage unit.

The device information may contain control command information that specifies a control command applicable to the detected controlled device, and the setting unit may set the control command information contained in the acquired device information to the storage unit.

The setting unit may acquire the device information from the detected controlled device by using URL contained in a response signal from the controlled device in response to the device search signal.

The communication unit may transmit the device search signal to the network at regular intervals.

The communication unit may transmit the device search signal to the network in response to occurrence of a specific event.

According to another embodiment of the present disclosure, there is provided a method for setting a control command in a remote control device including a communication unit that can perform communication through a network, a remote control unit that can transmit one or more control commands to a controlled device in response to an operation by a user, and a storage unit that stores control command information specifying the one or more control commands to be transmitted from the remote control unit, the method including: detecting a controlled device connected to the network by transmitting a device search signal from the communication unit to the network; acquiring device information of the detected controlled device from the controlled device; and setting the control command information acquired based on the acquired device information to the storage unit.

According to another embodiment of the present disclosure, there is provided a program causing a computer that controls a remote control device including a communication unit that can perform communication through a network, a remote control unit that can transmit one or more control commands to a controlled device in response to an operation by a user, and a storage unit that stores control command information specifying the one or more control commands to be transmitted from the remote control unit, to function as: a setting unit that sets the control command information to the storage unit based on a result of communication by the communication unit with a controlled device through the network, wherein the setting unit detects a controlled device connected to the network by transmitting a device search signal from the communication unit to the network, acquires device information of the detected controlled device from the controlled device, and decides the control command information to be set to the storage unit based on the acquired device information.

According to the embodiments of the present disclosure described above, it is possible to provide a remote control device, a remote control setting method, and a program that can reduce the burden of a user at the time of setting a control command system for a new controlled device.

BRIEF DESCRIPTION OF THE DRAWINGS

FIG. 5 is an explanatory view showing an example of control command information stored in a storage unit according to one embodiment;

FIG. 6 is an explanatory view showing an example of candidates for control command information stored in a storage unit according to one embodiment;

FIG. 7 is an explanatory view to explain an example of a format of a device search signal according to one embodiment;

FIG. 8 is an explanatory view to explain an example of a format of a response signal to a device search signal according to one embodiment;

FIG. 9 is an explanatory view to explain an example of device information according to one embodiment;

FIG. 12 is an explanatory view to explain an example of device information according to one alternative example.

DETAILED DESCRIPTION OF THE EMBODIMENT(S)

Figure 1:
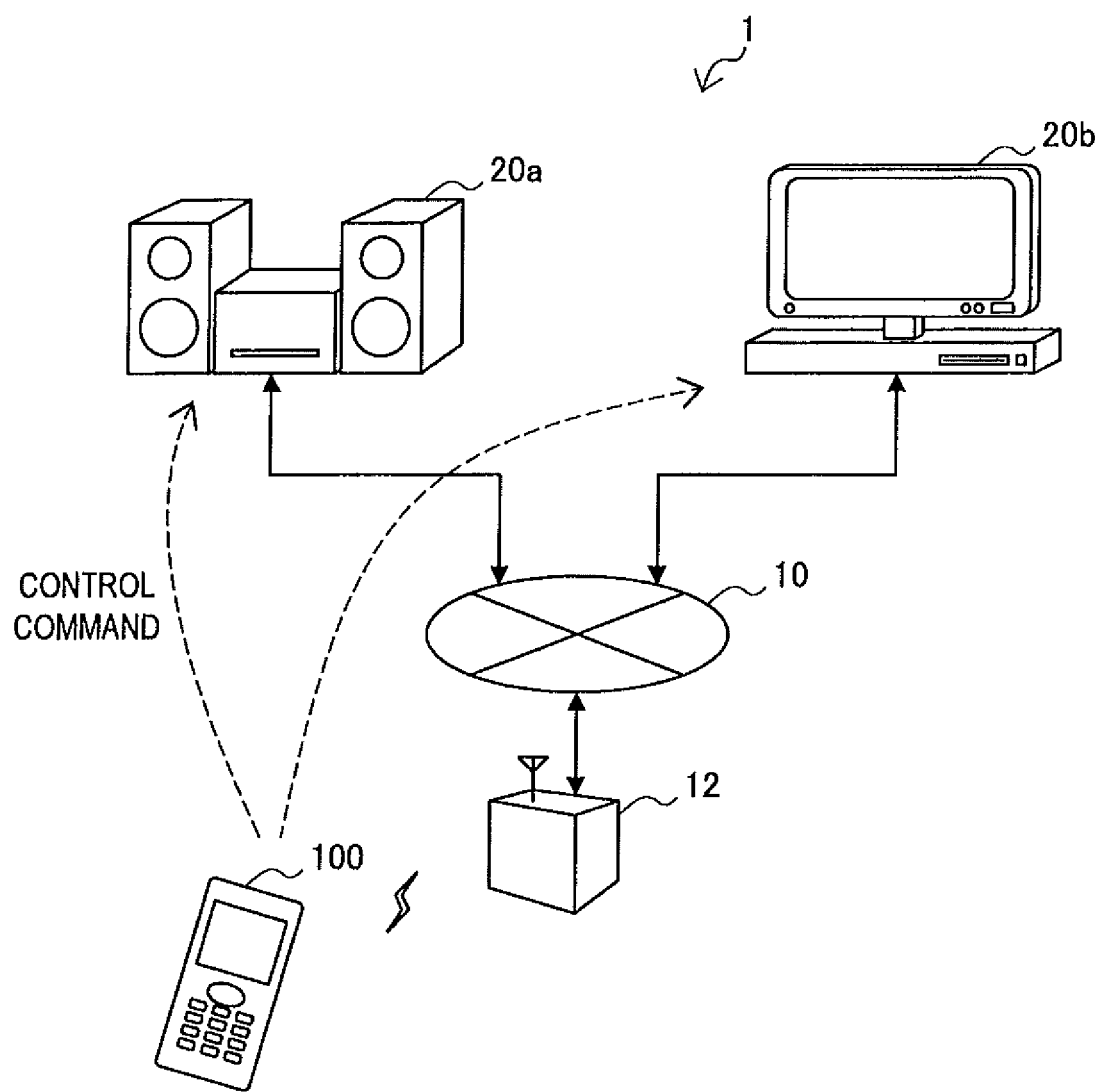
FIG. 1 is an illustration showing an overview of a remote control system according to one embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the disclosure will be described hereinafter in the following order.

1. Overview of System
2. Exemplary Configuration of Remote Control Device
2-1. Communication Unit
2-2. User Interface Unit
2-3. Remote Control Unit
2-4. Database
2-5. Storage Unit
2-6. Setting Unit
3. Flow of Process
4. Alternative Example
5. Summary 1. Overview of System FIG. 1 is an illustration showing an overview of a remote control system 1 according to one embodiment of the disclosure. Referring to FIG. 1, the remote control system 1 includes a remote control device 100 and controlled devices 20a and 20b. The controlled devices 20a and 20b are connected to a network 10. Further, the remote control device 100 is connected to the network 10 through a wireless access point 12.

The network 10 may be a home network that connects a plurality of household electrical appliances such as digital household electrical appliances or information equipment with one another at home, for example. Alternatively, the network 10 may be an in-house LAN (Local Area Network) or the like which is built within an office, for example. Although the example in which the remote control device 100 wirelessly accesses the network 10 is shown in FIG. 1, the network 10 is not limited thereto. Specifically, any part of the network 10 may be wired or wireless. In the case where wireless connection is used in the network 10, the wireless access point 12 can be installed within the network 10. Further, the network 10 may be constructed partly or entirely as a PAN (Personal Area Network) which uses a connection technique such as UWB (Ultra Wide Band) or Zigbee, for example.

The controlled devices 20a and 20b are devices that can operate according to a control command transmitted from the remote control device 100. In the example of FIG. 1, the controlled device 20a is a digital audio player, and the controlled device 20b is a digital television. Note, however, that the controlled devices 20a and 20b may be other kinds of household electrical appliances, information equipment, game machines or the like. Further, three or more controlled devices may be connected to the network 10.

In this embodiment, the controlled devices 20a and 20b have a discovery function for interconnection through the network 10. For example, the controlled devices 20a and 20b may be devices in which UPnP (Universal Plug and Play) is implemented. In this case, a control point in the network 10 can detect the controlled devices 20a and 20b that are connected to the network 10 by use of M-SEARCH method of SSDP (Simple Service Discovery Protocol).

The remote control device 100 is a device that can transmit a control command to the controlled devices 20a and 20b according to a user's operation. The remote control device 100 is thus used as a so-called universal remote controller. The remote control device 100 may be a simple remote controller or a terminal device such as a mobile phone or a PDA (Personal Digital Assistant) having a remote control function.

Further, in this embodiment, the remote control device 100 can communicate with the controlled devices 20a and 20b through the network 10. The remote control device 100 can serve as a control point in UPnP, for example. Therefore, the remote control device 100 can detect the controlled devices 20a and 20b by using the above-described M-SEARCH method.

It should be noted that, in the following description of this specification, when there is no particular need to distinguish between the controlled devices 20a and 20b, they are referred to simply as the controlled device 20 by omitting the alphabetical letter at the end of the reference numeral.

2. Exemplary Configuration of Remote Control Device

Figure 2:
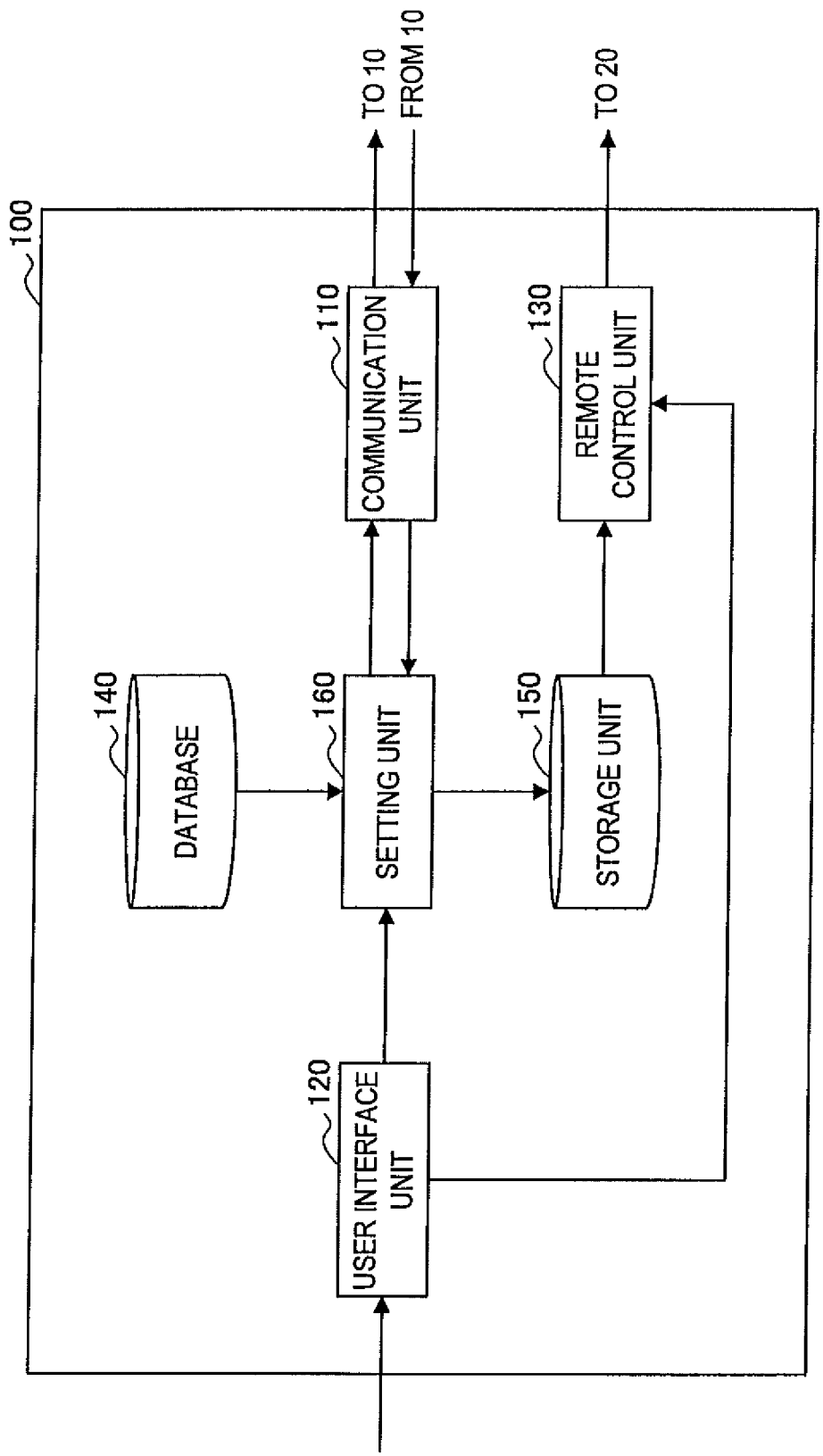
FIG. 2 is a block diagram showing an example of a configuration of a remote control device according to one embodiment.

FIG. 2 is a block diagram showing an example of a logical configuration of the remote control device 100 according to the embodiment. Referring to FIG. 2, the remote control device 100 includes a communication unit 110, a user interface unit 120, a remote control unit 130, a database 140, a storage unit 150, and a setting unit 160.

[2-1. Communication Unit]

The communication unit 110 corresponds to a communication interface for the remote control device 100 to perform communication through the network 10. The communication unit 110 may be a communication interface that supports an arbitrary communication protocol such as Ethernet (registered trademark) for wired LAN or IEEE802.11a/b/g/n for wireless LAN, for example.

[2-2. User Interface Unit]

The user interface unit 120 detects a user operation through an operating means such as a touch panel, a button, a key, a switch, a dial or the like which is mounted on the remote control device 100, and outputs an operation signal corresponding to the type of the operation to the remote control unit 130 and the setting unit 160. Further, when the remote control device 100 has a function (or an application) other than the remote control, the user interface unit 120 accepts a user operation for such a function (though not shown).

[2-3. Remote Control Unit]

The remote control unit 130 receives the operation signal associated with remote control from the user interface unit 120 and then generates a control command corresponding to the type of the input operation signal by using control command information stored in the storage unit 150. The remote control unit 130 then transmits the generated control command to the controlled device 20. The control command may be transmitted typically as an infrared signal from an infrared interface of the remote control unit 130. Alternatively, the control command may be transmitted as a communication signal based on another communication protocol such as Bluetooth (registered trademark), for example.

[2-4. Database]

The database 140 stores a device class for identifying the type of a known controlled device 20 and associated control command information about a controlled device belonging to each device class in advance by using a storage medium such as semiconductor memory or hard disk. In this specification, the device class may be data that can identify the type of the controlled device 20, which at least allows differentiation between devices having different control command systems. Thus, a manufacturer name and a model name of the controlled device 20 can be used as the device class of the controlled device 20, for example.

Figure 3:
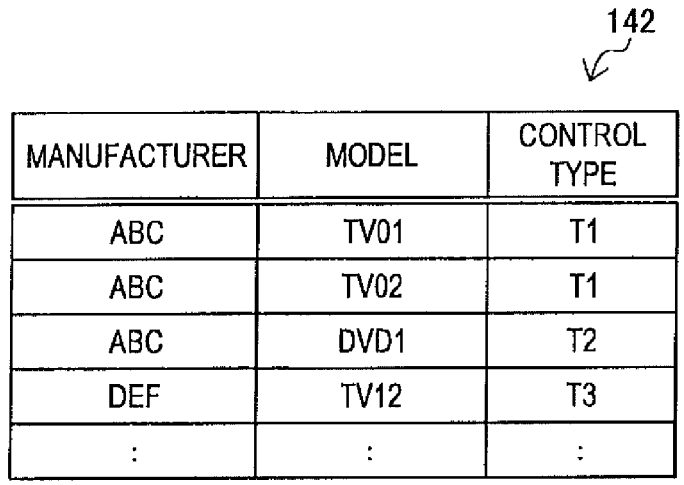
FIG. 3 is a first explanatory view to explain data stored in a database according to one embodiment.
Figure 4:
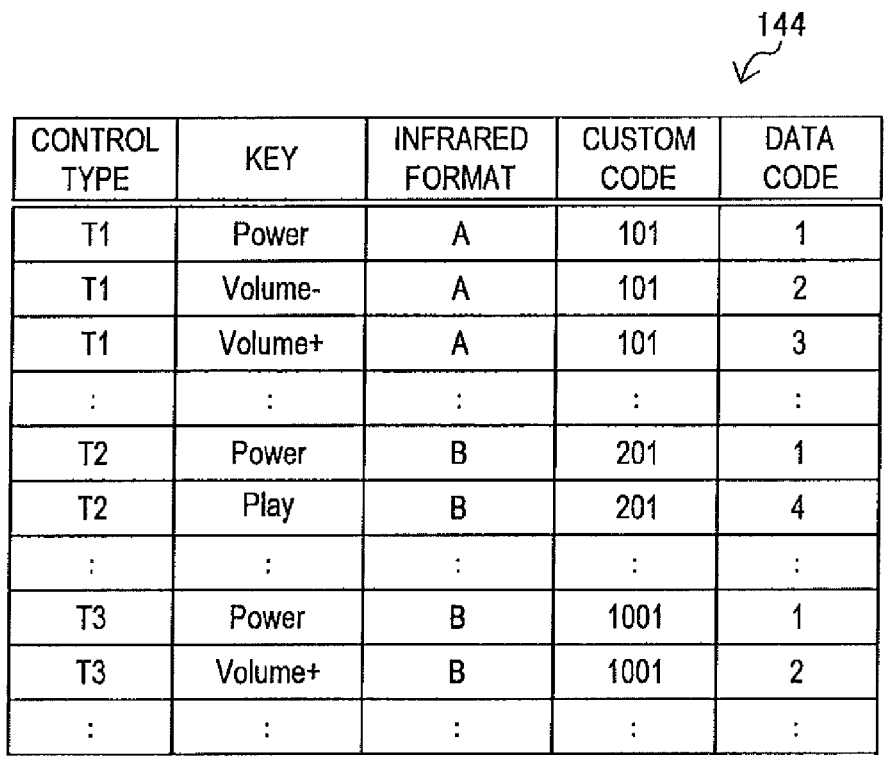
FIG. 4 is a second explanatory view to explain data stored in a database according to one embodiment.

FIGS. 3 and 4 are explanatory views to explain data stored in the database 140 according to the embodiment.

FIG. 3 shows a control type table 142 as an example of the data stored in the database 140. The control type table 142 has three data items: "manufacturer", "model" and "control type". The item "manufacturer" stores a name, a code, a number or the like that identify the manufacturer of each controlled device 20. The item "model" stores a name, a code, a number or the like of the model of the controlled device 20 in the manufacturer which is identified by "manufacturer". The item "control type" stores a code that specifies control command information corresponding to the type of the controlled device 20 which is identified by a combination of "manufacturer" and "model".

In the example of FIG. 3, the first record and the second record indicate that the control type of the models "TV01" and "TV02" which are manufactured by the manufacturer "ABC" is both "T1". Accordingly, the models "TV01" and "TV02" of the manufacturer "ABC" can be remotely controlled by a common control command system corresponding to "T1". Further, the third record indicates that the control type of the model "DVD01" which is manufactured by the manufacturer "ABC" is "T2". The fourth record indicates that the control type of the model "TV12" which is manufactured by the manufacturer "DEF" is "T3".

FIG. 4 shows a command system table 144 as an example of the data stored in the database 140. The command system table 144 has five data items: "control type", "key", "infrared format", "custom code", and "data code". The item "control type" specifies control command information that belongs to one control command system in the command system table 144. For example, in FIG. 4, the control type of the first record to the third record in the command system table 144 is "T1". Thus, all of the information contained in those three records are the control command information that belongs to one command system. Likewise, in FIG. 4, the control type of the fifth record to the sixth record in the command system table 144 is "T2". Thus, all of the information contained in those two records are the control command information that belongs to one command system.

The item "key" corresponds to each operating means of the user interface unit 120 of the remote control device 100. For example, the key of the first record in the command system table 144 is "Power". This indicates that the record contains information about a control command which should be generated when a "Power" button mounted on the remote control device 100 is pressed (or a software button is tapped), for example. Likewise, the key of the second record in the command system table 144 is "Volume-". This indicates that the record contains information about a control command which should be generated when a "Volume-(volume down)" button mounted on the remote control device 100 is pressed, for example.

The items "infrared format", "custom code", and "data code" are data items that can be used for the remote control unit 130 to generate a control command as an infrared signal. The item "infrared format" specifies the format of an infrared signal that can differ depending on manufacturer or model. The items "custom code", and "data code" contain parameters that can be used for different purposes depending on "infrared format".

The item "control type" in the control type table 142 and the command system table 144 associates the control command system and the type of the controlled device 20 with each other. Specifically, in this embodiment, when "manufacturer" and "model" of the controlled device 20 are given, "control type" that decides a control command system for the controlled device 20 can be specified by referring to the control type table 142. Then, by extracting control command information that belongs to the specified "control type" from the command system table 144, the control command information for generating a control command to be used for remote control of the controlled device 20 can be obtained.

Preferably, in the control type table 142 of the database 140, "manufacturer" and "model" of various types of the controlled devices 20 that can be placed on the market by one or a plurality of manufacturers, and the corresponding "control type" can be registered in advance. Further, in the command system table 144 of the database 140, control command information belonging to the control command system of each "control type" registered in the control type table 142 can be registered in advance.

As described above, the control command information registered in the command system table 144 is information that can be used for the remote control unit 130 to generate a control command. The command system table 144 contains a large variety of control command information that belong to a plurality of control command systems. Thus, the remote control device 100 acquires control command information for a control command system that is likely to be actually used by the remote control unit 130 from the database 140 and stores the acquired control command information into the storage unit 150 described next. Note that, in this specification, a process that stores control command information for a control command system that is likely to be actually used by the remote control unit 130 into the storage unit 150 is referred to as setting of control command information.

It should be noted that FIG. 2 shows the example in which the remote control device 100 has the database 140 internally. However, the database 140 may be placed in an external database server that is configured separately from the remote control device 100. In this case, the remote control device 100 can access the database 140 in the external database server through the communication unit 110, for example.

[2-5. Storage Unit]

The storage unit 150 stores the control command information that specifies one or more control commands which is transmitted from the remote control unit 130 by using a storage medium such as semiconductor memory.

FIG. 5 is an explanatory view showing an example of control command information stored in the storage unit 150 according to the embodiment. FIG. 5 shows a control command information table 152 as an example of the data stored in the storage unit 150. The control command information table 152 is a table that is referred to when the remote control unit 130 generates a control command in response to an operation by a user. In the control command information table 152, only the control command information that belongs to one control command system among the control command systems prestored in the database 140 can be set.

The control command information table 152 has five data items: "registered name", "key", "infrared format", "custom code", and "data code". The item "registered name" is a name for differentiating the control command system that is set to the control command information table 152. In the example of FIG. 5, a combination of the manufacturer name and the model name of the controlled device 20 which are recognized when setting the control command system is used as "registered name". Note that "registered name" is not limited to such an example, and it may be a name that is given afterwards by a user, for example. The values of the respective data items "key", "infrared format", "custom code", and "data code" are extracted from the command system table 144 of the database 140 and duplicated in the control command information table 152. Then, the remote control unit 130 refers to the control command information in the control command information table 152 and thereby generates a control command in response to a user operation. For example, in the case where the control command information illustrated in FIG. 5 is set to the control command information table 152, when a user presses the "Power" button, the remote control unit 130 generates a control command as an infrared signal that is specified by the infrared format: "A", the custom code: "101", and the data code: "1", and transmits the generated control command to the controlled device 20.

Further, the storage unit 150 stores control command information of one or more candidates for the control command system that are likely to be used by a user from a large number of control command systems stored in the database 140 into a control command candidate table 154 as illustrated in FIG. 6.

Referring to FIG. 6, the control command candidate table 154 has five data items: "registered name", "key", "infrared format", "custom code", and "data code", which are the same as in the control command information table 152. However, as is understood from the example of FIG. 6 in which a plurality of "registered names" exist, the control command candidate table 154 can store control command information that belong to a plurality of control command systems among the control command systems prestored in the database 140. The control command information stored in the control command candidate table 154 can typically include the control command information about the control command systems of the controlled devices 20 connected in the past to the network 10 and connected currently to the network 10. Among the control command information stored in the control command candidate table 154, the control command information about the control command system which is selected by a user through a selection screen or selected automatically by the remote control device 100 can be set to the control command information table 152.

From the above-described aspect, the remote control device 100 according to the embodiment is similar to the preset remote controller. However, in the hitherto known preset remote controller, it has been not easy to appropriately select and set a control command system that is likely to be used by a user from a vast number of control command systems that can be pre-registered in the database 140. On the other hand, the remote control device 100 according to the embodiment reduces the burden of a user at the time of setting a control command system by the following mechanism.

[2-6. Setting Unit]

The setting unit 160 sets the control command information about one or more control command systems acquired from the database 140 into the storage unit 150 based on a result of communication of the communication unit 110 with the controlled device 20 through the network 10. Specifically, the setting unit 160 first detects the controlled device 20 connected to the network 10 by transmitting a device search signal from the communication unit 110 to the network 10. Next, the setting unit 160 acquires device information of the detected controlled device 20 from the controlled device 20. Then, the setting unit 160 decides the control command information to be set to the storage unit 150 based on the acquired device information. In this embodiment, the device information that is acquired from the controlled device 20 by the setting unit 160 at least contains data corresponding to a device class for identifying the type of the detected controlled device 20. Thus, the setting unit 160 extracts data corresponding to a device class from the device information acquired from the controlled device 20 and sets the control command information that is associated with the device class in the database 140 to the storage unit 150.

FIG. 7 is an explanatory view to explain an example of the format of a device search signal that is transmitted from the communication unit 110 in this embodiment. FIG. 7 shows a device search signal 162 as an example. The device search signal 162 is a signal that is transmitted in accordance with the M-SEARCH method of SSDP. The device search signal 162 contains a header indicating that the signal is in accordance with the M-SEARCH method, and a plurality of fields such as destination host field, for example. In the signal, "ST" field ("ST:ssdp:all") indicates that a response is required for all devices that receive the device search signal 162 (that support SSDP). The device search signal 162 can be typically broadcasted in the network 10 and received by all the controlled devices 20 that are connected to the network 10.

FIG. 8 is an explanatory view to explain an example of the format of a response signal to the device search signal 162 illustrated in FIG. 7. FIG. 8 shows a response signal 164 as an example. The response signal 164 contains an HTTP header and a plurality of fields such as cache control field indicating the valid period of the contents of a response, for example. In the signal, "LOCATION" field contains URL (Uniform Resource Locator) for accessing the device information about the controlled device 20 that has transmitted the response signal 164 in response to the device search signal 162. For example, when the controlled device 20 is compliant with UPnP, the URL is URL for accessing so-called "Device Description". Thus, in this case, the setting unit 160 transmits an HTTP request to the controlled device 20, targeting the URL contained in the "LOCATION" field of the response signal 164, for example, and thereby acquires "Device Description" as the device information from the controlled device 20.

FIG. 9 is an explanatory view showing an example of device information according to the embodiment. In FIG. 9, device information 166 in accordance with the format of "Device Description" that can be acquired from the controlled device 20 in compliance with UPnP is partly shown as an example. "Device Description" is described in XML. The device information 166 contains a device class 168 of the controlled device 20. The device class 168 is composed of a manufacturer name designated by <manufacturer> tag and a model name designated by <modelName> tag under <device> node. In the example of FIG. 9, the manufacturer name enclosed by <manufacturer> tag is "ABC", and the model name enclosed by <modelName> tag is "TV01". The setting unit 160 extracts the device class 168 from the device information 166, for example, and specifies a record of the control type table 142 in the database 140 which matches the value of the extracted device class 168. Then, the setting unit 160 decides the control command information corresponding to the control type of the specified record as control command information to be set to the storage unit 150. Note that, the device class is not limited to the example of FIG. 9, and data designated by another tag in "Device Description" may be used as the device class.

Searching of the controlled device 20 and setting of a control command in the remote control device 100 described above may be performed automatically at given intervals, such as once in several minutes or several hours, for example, without waiting for an instruction from a user. In other words, the communication unit 110 may transmit a device search signal to the network 10 at regular intervals. Further, the communication unit 110 may transmit a device search signal to the network 10 in response to the occurrence of a specific event (e.g. power-on, display of a top screen, reception of a connection notification signal from the controlled device 20 etc.). In this configuration, the remote control device 100 can automatically set the control command information for the control command system that is likely to be used by a user to the storage unit 150 without need of an explicit instruction from a user for searching of the controlled device 20.

Note that the device search signal that is transmitted from the communication unit 110 is typically broadcasted in the network 10. Therefore, a plurality of controlled devices 20 can send response signals to the device search signal. In this case, the setting unit 160 may sequentially perform acquisition of device information using URL contained in the response signal, extraction of a device class from the device information, acquisition of control command information corresponding to the extracted device class, and setting of the acquired control command information to the storage unit 150 for each of a plurality of response signals. Further, when there are a plurality of control command systems to be set to the storage unit 150, the setting unit 160 may display a list of registered names of the respective control command systems on a screen and prompt a user to select one control command system to be set to the control command information table 152, for example.

3. Flow of Process

Figure 10:
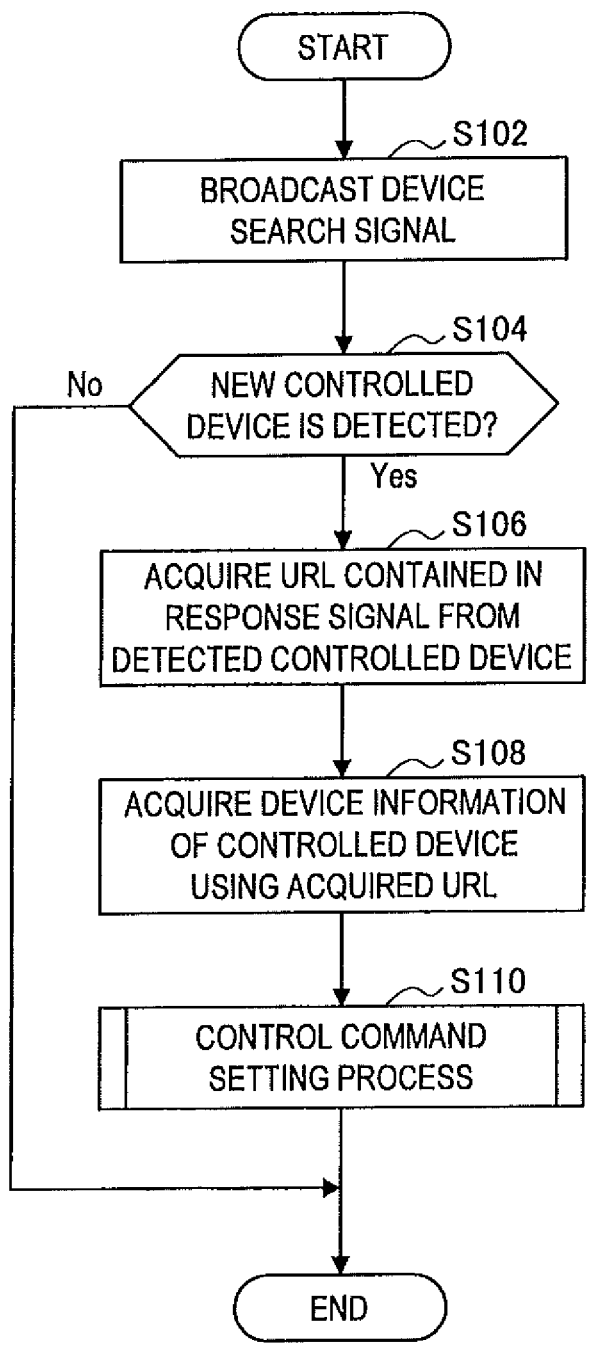
FIG. 10 is a flowchart showing an example of a flow of a process by a remote control device according to one embodiment.
Figure 11:
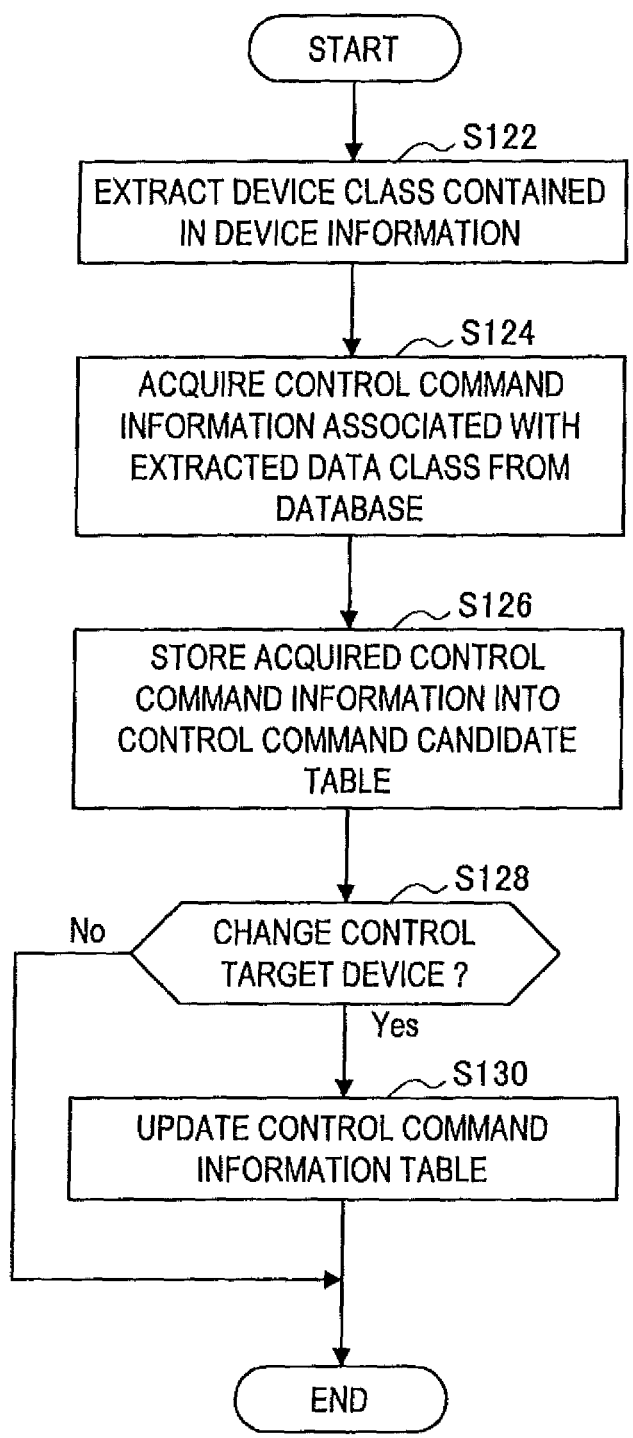
FIG. 11 is a flowchart showing an example of a detailed flow of a control command setting process by a remote control device according to one embodiment.

An example of a flow of a process by the remote control device 100 according to the embodiment is described hereinafter with reference to FIGS. 10 and 11. FIG. 10 is a flowchart showing an example of a flow of a process by the remote control device 100. FIG. 11 is a flowchart showing an example of a detailed flow of a control command setting process by the remote control device 100.

Referring to FIG. 10, the setting unit 160 first transmits a device search signal from the communication unit 110 to the network 10 (step S102). The device search signal transmitted in this step is broadcasted in the network 10 and received by the controlled device 20 connected to the network 10. Next, the setting unit 160 determines whether a new controlled device 20 connected to the network 10 is detected or not (step S104). For example, when a response signal is received from the controlled device 20 within a specific waiting time and the controlled device 20 which has transmitted the response signal is an unknown controlled device 20, the setting unit 160 can determine that a new controlled device 20 is detected. When a new controlled device 20 is not detected in the step S104, the subsequent processing is skipped. On the other hand, when a new controlled device 20 is detected in the step S104, the process proceeds to step S106.

Next, the setting unit 160 acquires URL of device information contained in the response signal from the detected controlled device 20 (step S106). Then, the setting unit 160 acquires device information of the controlled device 20 from the detected controlled device 20 by using the acquired URL (step S108). After that, the setting unit 160 performs a control command setting process based on the acquired device information (step S110). Note that the processing from the step S106 to the step S110 described above can be repeated for every new controlled device 20 detected in the step S104.

Referring next to FIG. 11, in the control command setting process, the setting unit 160 first extracts a device class such as a manufacturer name and a model name of the controlled device 20 from the device information as illustrated in FIG. 9, for example (step S122). Next, the setting unit 160 acquires control command information associated with the extracted device class from the database 140 (step S124). The control command information associated with the extracted device class may be control command information in the command system table 144 which corresponds to the control type of the record with the matching manufacturer name and the model name in the control type table 142, for example. Then, the setting unit 160 stores the control command information acquired from the database 140 into the control command candidate table 154 after adding a registered name thereto (step S126).

Further, the setting unit 160 determines whether to change the controlled device 20 to be controlled by the remote control device 100 (step S130). For example, when control command information for a new control command system is stored into the control command candidate table 154, the setting unit 160 may display a confirmation screen on the screen of the remote control device 100. The confirmation screen displayed in this step is a screen for a user to select whether to change a control target device to be controlled by the remote control device 100 from the controlled device 20 which has been a target of control up to then (e.g. the controlled device 20a in FIG. 1) to a newly detected controlled device 20 (e.g. the controlled device 20b in FIG. 1). Then, when the setting unit 160 determines that a control target device should be changed according to a selection by a user, for example, the setting unit 160 updates the contents of the control command information table 152 to the new control command information stored in the control command candidate table 154 (step S130). As a result, remote control by the remote control device 100 which targets the newly detected controlled device 20 becomes possible.

Note that, in the control command setting process of FIG. 11, the control command information which has been stored into the control command candidate table 154 but not set to the control command information table 152 can be selected afterwards through a selection screen provided to a user by the remote control device 100.

4. Alternative Example

One alternative example of the embodiment is descried hereinafter with reference to FIGS. 12 and 13. In one alternative example of the embodiment, the device information acquired from the controlled device 20 which is detected by the setting unit 160 may contain control command information that specifies a control command applicable to the controlled device 20. In this case, the setting unit 160 extracts the control command information contained in the device information acquired from the controlled device 20 and sets the extracted control command information to the storage unit 150.

FIG. 12 is an explanatory view to explain an example of device information according to the alternative example. Referring to FIG. 12, the format of device information 266, which is an extension of "Device Description" illustrated in FIG. 9, is partly shown. The device information 266 contains the device class 168 of the controlled device 20 illustrated in FIG. 9. Further, the device information 266 contains control command information 244 that specifies a control command applicable to the controlled device 20. The control command information 244 is information that defines "infrared format": <format> and "custom code": <customCode> and "data code": <dataCode> for each "key" in XML. When the device information acquired from the controlled device 20 contains control command information that specifies a control command applicable to the controlled device 20 in this manner, the setting unit 160 can acquire the control command information to be set to the storage unit 150 directly from the device information without accessing the database 140.

Figure 13:
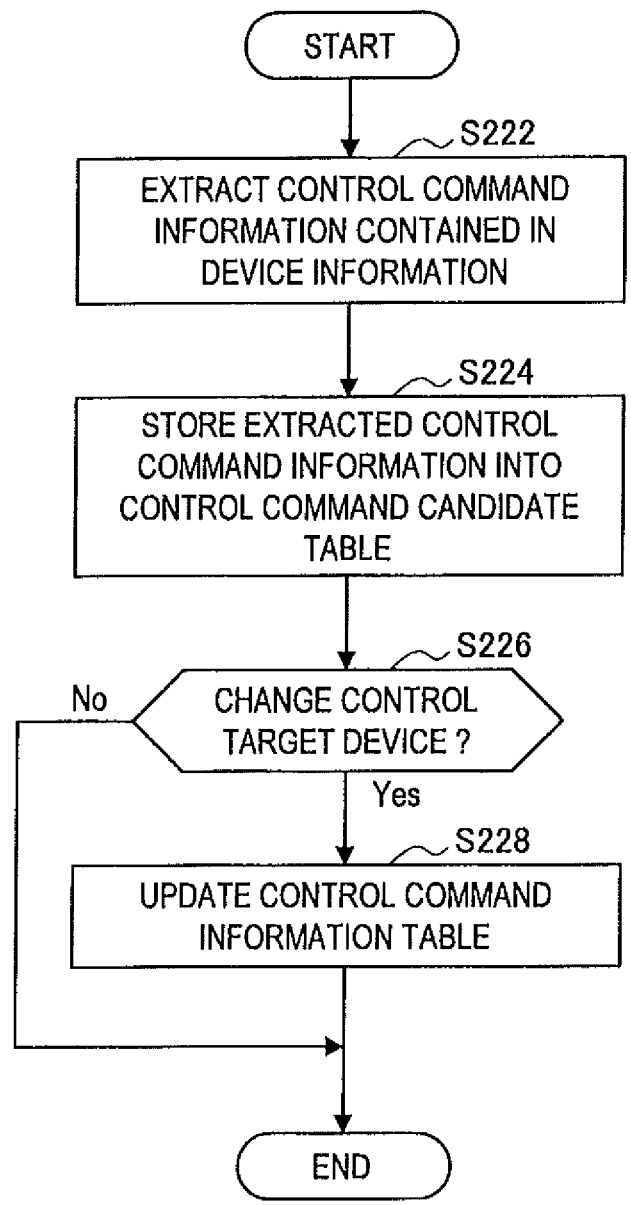
FIG. 13 is a flowchart showing an example of a detailed flow of a control command setting process by a remote control device according to one alternative example.

FIG. 13 is a flowchart showing an example of a detailed flow of a control command setting process by the remote control device 100 according to the alternative example. Note that, prior to the start of the flowchart of FIG. 13, the processing of the steps S102 to S108 up to acquisition of device information shown in FIG. 10 is performed.

Referring to FIG. 13, the setting unit 160 first extracts control command information that specifies a control command applicable to the controlled device 20 from the device information as illustrated in FIG. 12, for example (step S222). Next, the setting unit 160 stores the extracted control command information into the control command candidate table 154 into the control command candidate table 154 after adding a registered name thereto (step S224).

Further, the setting unit 160 determines whether to change the controlled device 20 to be controlled by the remote control device 100 (step S226). When the setting unit 160 determines that a control target device should be changed, the setting unit 160 updates the contents of the control command information table 152 to the new control command information stored in the control command candidate table 154 (step S228). As a result, remote control by the remote control device 100 which targets the newly detected controlled device 20 becomes possible.

5. Summary

An embodiment of the disclosure and its alternative example are described above with reference to FIGS. 1 to 13. According to the configuration of the remote control device described above, a device search signal is transmitted to a network to which the remote control device is connected, and a controlled device connected to the network is detected. Then, device information of the detected controlled device is automatically acquired, and control commands for remotely controlling the detected controlled device are set based on the acquired device information. In this configuration, a user does not need to select an appropriate control command system for a new controlled device from a large number of control command systems in a database. This thus reduces the burden of a user at the time of setting a control command system for a new controlled device. Further, because a control command system is set simply by connecting the remote control device and the controlled device to the network, a user can make remote control of desired equipment promptly after purchase of the equipment in the situation where a home network is used.

Further, according to the embodiment, the device information contains a device class for identifying the type of the detected controlled device. Then, the remote control device sets control command information associated in advance with the device class contained in the device information as control commands for remotely controlling the controlled device. The device information that contains a device class corresponds to "Device Description" provided by a controlled device in compliance with UPnP, for example. Thus, according to the above-described configuration, it is not necessary to make a particular alteration to the controlled device in order to apply the embodiment as long as the controlled device is compliant with UPnP. Therefore, the reduction of the burden of a user at the time of setting a control command system, which is an important advantage of a universal remote controller, can be provided not only for controlled devices coming on the market but also for the existing controlled devices.

Further, according to the alternative example described above, because control command information that specifies a control command applicable to the detected controlled device is contained in the device information, the remote control device can learn a control command system that is not pre-registered in the database in an ex post manner. The device information that contains control command information corresponds to an extension of "Device Description" provided by a controlled device in compliance with UPnP, for example. In this case, because ex-post learning of a control command system can be made simply by extending the tag of "Device Description", a disadvantage for a manufacturer in terms of cost is small. Further, the burden of work placed on a user at the time of learning can be reduced.

The series of processes by the setting unit 160 of the remote control device 100 described in this specification is typically implemented using software. A program composing the software that implements the series of processes may be prestored in a storage medium mounted to the remote control device 100, for example. Then, each program is read into RAM (Random Access Memory) of the remote control device 100 upon execution and executed by a processor such as CPU (Central Processing Unit), for example.

Although preferred embodiments of the disclosure are described in detail above with reference to the appended drawings, the disclosure is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. A remote control device comprising:
a communication unit that can perform communication through a network;
a remote control unit that can transmit one or more control commands directly to a desired controlled device in response to an operation by a user, in which the desired controlled device is a controllable type device located external to the remote control device which is desired to be directly controlled by the user of the remote control device;
a storage unit that stores control command information specifying the one or more control commands to be transmitted from the remote control unit; and
a setting unit that automatically sets or stores the control command information, representative of a respective control command or commands transmittable by the remote control unit directly to a respective controlled device, to the storage unit after the remote control device and the respective controlled device are connected to the network without a need for the user to perform a selection procedure to obtain the control command information,
wherein the setting unit is configured to automatically set or store the control command information to the storage unit by (i) automatically transmitting a device search signal from the communication unit to the network so as to detect the respective controlled device, and (ii) automatically acquiring device information of the detected respective controlled device from the detected respective controlled device and deciding the control command information to be set to the storage unit based on the acquired device information, in which the acquired device information of the detected controlled device includes information corresponding to at least one of a manufacturer or a model of the detected controlled device.

2. The remote control device according to claim 1, wherein the device information contains a device class for identifying a type of the detected controlled device,
the remote control device is accessible to an internal or external database that stores one or more known device classes and associated control command information for a controlled device belonging to each device class, and
the setting unit sets the control command information associated with the device class contained in the acquired device information in the database to the storage unit.

3. The remote control device according to claim 1, wherein the device information contains control command information that specifies a control command applicable to the detected controlled device, and
the setting unit sets the control command information contained in the acquired device information to the storage unit.

4. The remote control device according to claim 1, wherein the setting unit acquires the device information from the detected controlled device by using URL contained in a response signal from the controlled device in response to the device search signal.

5. The remote control device according to claim 1, wherein the communication unit transmits the device search signal to the network at regular intervals.

6. The remote control device according to claim 1, wherein the communication unit transmits the device search signal to the network in response to occurrence of a specific event.

7. The remote control device according to claim 1, in which transmission of the device search signal conforms to a M-search method of SSDP (Simple Service Discovery Protocol).

8. A method for setting a control command in a remote control device including
a communication unit that can perform communication through a network,
a remote control unit that can transmit one or more control commands directly to a desired controlled device in response to an operation by a user, in which the desired controlled device is a controllable type device located external to the remote control device which is desired to be directly controlled by the user of the remote control device, and
a storage unit that stores control command information specifying the one or more control commands to be transmitted from the remote control unit,
the method comprising:
automatically setting or storing the control command information, representative of a respective control command or commands transmittable by the remote control unit directly to a respective controlled device, to the storage unit after the remote control device and the respective controlled device are connected to the network without a need for the user to perform a selection procedure to obtain the control command information,
wherein the automatically setting or storing the control command information to the storage unit includes (i) automatically transmitting a device search signal from the communication unit to the network so as to detect the respective controlled device, and (ii) automatically acquiring device information of the detected respective controlled device from the detected respective controlled device and deciding the control command information to be set to the storage unit based on the acquired device information, in which the acquired device information of the detected controlled device includes information corresponding to at least one of a manufacturer or a model of the detected controlled device.

9. A non-transitory computer readable medium having stored thereon a program causing a computer that controls a remote control device including a communication unit that can perform communication through a network, a remote control unit that can transmit one or more control commands directly to a desired controlled device in response to an operation by a user, in which the desired controlled device is a controllable type device located external to the remote control device which is desired to be directly controlled by the user of the remote control device, and a storage unit that stores control command information specifying the one or more control commands to be transmitted from the remote control unit, to function as:

a setting unit that automatically sets or stores the control command information, representative of a respective control command or commands transmittable by the remote control unit directly to a respective controlled device, to the storage unit after the remote control device and the respective controlled device are connected to the network without a need for the user to perform a selection procedure to obtain the control command information, wherein the setting unit is configured to automatically set or store the control command information to the storage unit by (i) automatically transmitting a device search signal from the communication unit to the network so as to detect the respective controlled device, and (ii) automatically acquiring device information of the detected respective controlled device from the detected respective controlled device and deciding the control command information to be set to the storage unit based on the acquired device information, in which the acquired device information of the detected controlled device includes information corresponding to at least one of a manufacturer or a model of the detected controlled device.

* * * * *